(12) United States Patent
Kitagawa

(10) Patent No.: US 7,136,390 B2
(45) Date of Patent: Nov. 14, 2006

(54) COMMUNICATION APPARATUS, COMMUNICATION SYSTEM, AND COMMUNICATION CONTROL METHOD

(75) Inventor: Mitsuhiro Kitagawa, Tokyo (JP)

(73) Assignee: NEC Corporation, Tokyo (JP)

( * ) Notice: Subject to any disclaimer, the term of this patent is extended or adjusted under 35 U.S.C. 154(b) by 1081 days.

(21) Appl. No.: 10/156,234

(22) Filed: May 29, 2002

(65) Prior Publication Data
US 2002/0181413 A1    Dec. 5, 2002

(30) Foreign Application Priority Data
May 30, 2001    (JP)    ............... 2001-161543

(51) Int. Cl.
*H04L 12/56*    (2006.01)
(52) U.S. Cl. ..................... 370/401; 370/389
(58) Field of Classification Search .............. 370/256, 370/401, 402, 400, 389, 395.3, 395.5
See application file for complete search history.

(56) References Cited

U.S. PATENT DOCUMENTS 5,761,435 A * 6/1998 Fukuda et al. .............. 709/238
5,790,808 A    8/1998 Seaman
6,188,694 B1    2/2001 Fine et al.
6,891,808 B1 * 5/2005 Ishii ........................ 370/256
2002/0176373 A1    11/2002 Sato
2002/0181412 A1    12/2002 Shibasaki

FOREIGN PATENT DOCUMENTS

| JP | 5-327719 | 12/1993 |
|----|----------|---------|
| JP | 7-264244 | 10/1995 |
| JP | 11-168490 | 6/1999 |
| JP | 2000-224214 | 8/2000 |
| JP | 2002-353987 | 12/2002 |
| JP | 2002-353998 | 12/2002 |

* cited by examiner

*Primary Examiner*—Brenda Pham
(74) *Attorney, Agent, or Firm*—Foley & Lardner LLP

(57) ABSTRACT

A bridge is devised to easily divide a spanning tree domain and to divide only a spanning tree domain while avoiding division of a broadcast domain. A spanning tree domain of a bridged LAN is divided in such a manner that a plurality of bridge protocol entities are provided in the bridge for connection between spanning trees, and ports of the bridge are assigned to the bridge protocol entities in a one-to-one relationship to enable the ports to participate respectively in different spanning trees. Spanning tree division is thus facilitated.

16 Claims, 8 Drawing Sheets

COMMUNICATION APPARATUS, COMMUNICATION SYSTEM, AND COMMUNICATION CONTROL METHOD

BACKGROUND OF THE INVENTION

1. Field of the Invention

The present invention relates to a communication apparatus, a communication system and a communication control method. More particularly, the present invention relates a spanning tree management bridge for interconnection between networks and to a method of constructing a spanning tree.

2. Description of the Related Art

A spanning tree is used to construct a local area network (LAN). Details of such a spanning tree are specified in IEEE802.1D. In a case where a plurality of LANs are interconnected by bridges, if a loop is formed when a broadcast packet is sent to the LANs, a phenomenon occurs in which passing of the broadcast packet through the loop is endlessly continued and the broadcast pack does not disappear. For the purpose of preventing such a phenomenon, a point in the communication path connected in loop form is logically disconnected by processing under a protocol called a spanning tree protocol (bridge protocol) to form a tree structure.

In a bridged LAN in which a plurality of LANs are interconnected by bridges, there is a need to divide the above-mentioned spanning tree domain for reasons described below. The first reason is because it is necessary to reduce unnecessary topology changes after occurrence of a fault by reducing the spanning tree reconstruction area in order to shorten the restoration time. The second reason is because it is necessary to reduce routes blocked by a spanning tree by reducing the spanning tree domain in order to eliminate a wasted operating band region.

FIG. 8 shows a bridge model in conformity with IEEE802. 1D. Referring to FIG. 8, the bridge model has ports #1 and #2 respectively connected to LAN segments in a spanning tree domain 100, and media access control (MAC) entities 3 and 4 are provided in correspondence with the ports. Each media access control (MAC) entity includes a frame reception section 10 or 61 and a frame transmission section 11 or 60. A configuration bridge protocol data unit (configuration BPDU) received by the frame reception section 10 or 61 is transmitted to a bridge protocol entity 30 in an upper-layer entity 1 through a logic link control (LLC) entity 20 or 40.

The bridge protocol entity 30 executes processing on the basis of the received configuration BPDU under the spanning tree protocol specified in IEEE802.1D. By executing processing under the spanning tree protocol, the bridge protocol entity 30 determines the port role of each of the ports #1 and #2 (root port, designated port, alternate port) and the port state (forwarding, blocking) and stores them in a port state information storage section 50 or 54 in a MAC relay entity 2.

A MAC relay entity 2 controls transfer or discard of data frames received from the MAC entities 3 and 4. The MAC relay entity 2 includes a forwarding processing section 51 which performs data frame transfer control by referring to the port state information storage section 50 and 54 and a filtering data base 52, and a learning processing section 53 which learns data frame transfer control up to the present time and stores learning results one after another in the filtering data base 52 to update the same.

Each of the frame transmission sections 11 and 61 transmits a data frame transferred from the forwarding processing section 51 to the spanning tree domain 100 through the port #1 or #2, receives a configuration BPDU for forming a spanning tree through the LLC entity 20 or 40, and transmits the received configuration BPDU to other bridges through the port #1 or #2.

In the conventional bridge model shown in FIG. 8, configuration BPDUs from the ports are collected in the common single bridge protocol entity 30 in the upper-layer entity 1. In this one bridge protocol entity 30, information about the port roles and the port state of the ports #1 and #2 is determined. Accordingly, all the ports in one bridge participate in one spanning tree domain 100, as shown in FIG. 8, so that the corresponding spanning tree cannot be divided.

If spanning tree division cannot be performed, a problem described below is encountered. When the link between some of the bridges constituting the network is lost due to a fault in the bridges or a fault in the network connected between the bridges, reconstruction of the spanning tree is performed in accordance with a prescription in IEEE802.1D. When this reconstruction is performed, spanning tree configuration information on the spanning tree constructed before (information stored in the port state information storage sections 50 and 54) and the filtering data base 52 for data packet forwarding that has been obtained by learning are entirely initialized and spanning tree reconstruction is newly performed.

A considerably long time, depending on the number of bridges constituting the reconstructed network of the tree, is required for the reconstruction, and data packets to be transferred onto the network are not transferred until the reconstruction is completed. That is, a condition similar to service interruption occurs. If the scale of the bridge network is larger (the number of bridges constituting the network is larger), this condition becomes marked.

As a method for dividing a spanning tree domain, a method of dividing the network by a router or a virtual LAN (VLAN) may be used. Such a method, however, simultaneously divides a broadcast domain. This means that the service for users is restricted for the network administrator's convenience.

SUMMARY OF THE INVENTION

An object of the present invention is to provide a communication apparatus, a communication system and a communication control method which are devised to easily divide a spanning tree domain and to divide only a spanning tree domain while avoiding division of a broadcast domain.

To achieve the above-described object, according to one aspect of the present invention, there is provided a communication apparatus including a plurality of ports connected to a network, and a plurality of bridge protocol processing means for constructing spanning trees, wherein the ports and the bridge protocol processing means are assigned in a one-to-one relationship with each other.

In the above-described communication apparatus, each of the bridge protocol processing means may construct a spanning tree by exchanging a bridge protocol data unit (BPDU) with other communication apparatuses through the port assigned to the bridge protocol processing means. The communication apparatus may further include transfer control means for controlling transfer of a data frame between the ports, and the transfer control means may transfer the data frame if the data frame is transferred between the ports belonging to one spanning tree domain.

Also, the transfer control means may transfer the data frame, provided that, in the case of transfer between the ports belonging to different spanning tree domains, data frame transfer between the different spanning tree domains is permitted in advance. Also, the bridge protocol processing means assigned to the ports belonging to one spanning tree domain may be given the same identification information, and the bridge protocol processing means assigned to the ports belonging to different spanning tree domains may be given different identification information items. In controlling transfer of the data frame, the transfer control means controls transfer of the data frame on the basis of the identity of the identification information between the source port and the destination port.

According to another aspect of the present invention, there is provided a communication system including a plurality of networks and a communication apparatus with which the networks are interconnected, and which includes a plurality of ports connected to the networks, and a plurality of bridge protocol processing means for constructing spanning trees. The ports and the bridge protocol processing means are assigned in a one-to-one relationship with each other.

According to still another aspect of the present invention, there is provided a method of controlling communication in a communication system including a plurality of networks and a communication apparatus with which the networks are interconnected, and which includes a plurality of ports connected to the networks, and a plurality of bridge protocol processing means for constructing spanning trees, the ports and the bridge protocol processing means being assigned in a one-to-one relationship with each other, the method including a step of constructing, through each of the bridge protocol processing means, a spanning tree by exchanging a bridge protocol data unit (BPDU) with other communication apparatuses through the port assigned to the bridge protocol processing means.

The above-described method may further include a transfer control step for controlling transfer of a data frame between the ports in the communication apparatus. In the transfer control step, the data frame is transferred if the transfer is performed between the ports belonging to one spanning tree domain. Also in the transfer control step, the data frame is transferred, provided that, in the case of transfer between the ports belonging to different spanning tree domains, data frame transfer between the different spanning tree domains is permitted in advance.

Also, the bridge protocol processing means assigned to the ports belonging to one spanning tree domain may be given the same identification information, and the bridge protocol processing means assigned to the ports belonging to different spanning tree domains may be given different identification information items. In controlling transfer of the data frame in the transfer control step, transfer of the data frame is controlled on the basis of the identity of the identification information between the source port and the destination port.

According to a further aspect of the present invention, there is provided a recording medium on which is recorded a program for making a computer execute control of the operation of a communication apparatus with which a plurality of networks are interconnected, and in which a plurality of ports connected to the networks and a plurality of bridge protocol processing means for constructing spanning trees are assigned in a one-to-one relationship with each other, the program including a step of constructing, through each of the bridge protocol processing means, a spanning tree by exchanging a bridge protocol data unit (BPDU) with other communication apparatuses through the port assigned to the bridge protocol processing means.

The function of the present invention will be described. A spanning tree domain of a network, e.g., a bridged LAN is divided in such a manner that a plurality of bridge protocol entities are provided in a bridge (communication apparatus) for connection between spanning trees, and ports of the bridge are assigned to the bridge protocol entities in a one-to-one relationship to enable the ports to participate respectively in different spanning trees. Thus, spanning tree division is facilitated and the above-described problem of the conventional art can be solved.

DETAILED DESCRIPTION OF THE PREFERRED EMBODIMENTS

Figure 1:
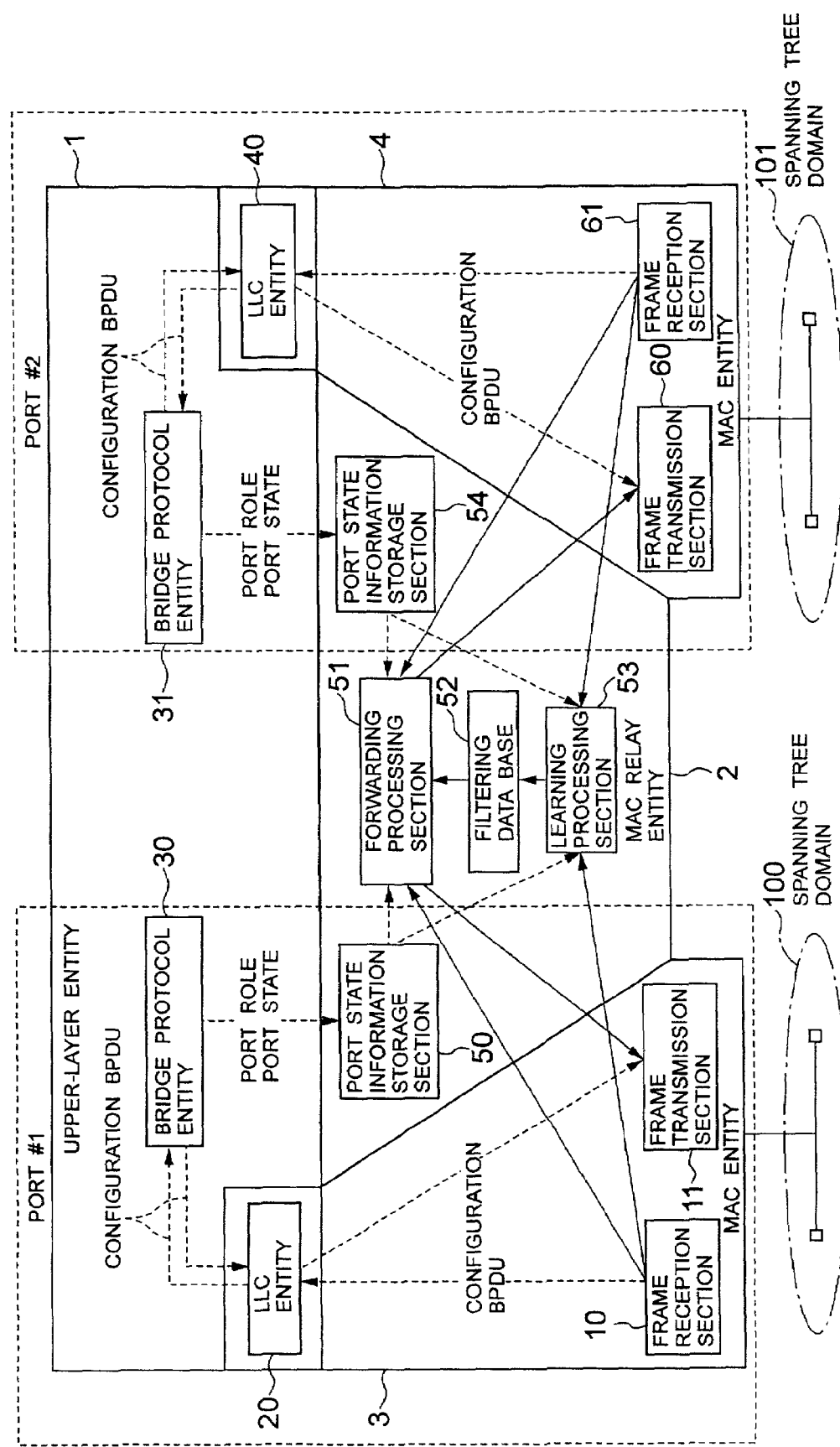
FIG. 1 is a block diagram showing the configuration of an embodiment of the present invention.
Figure 8:
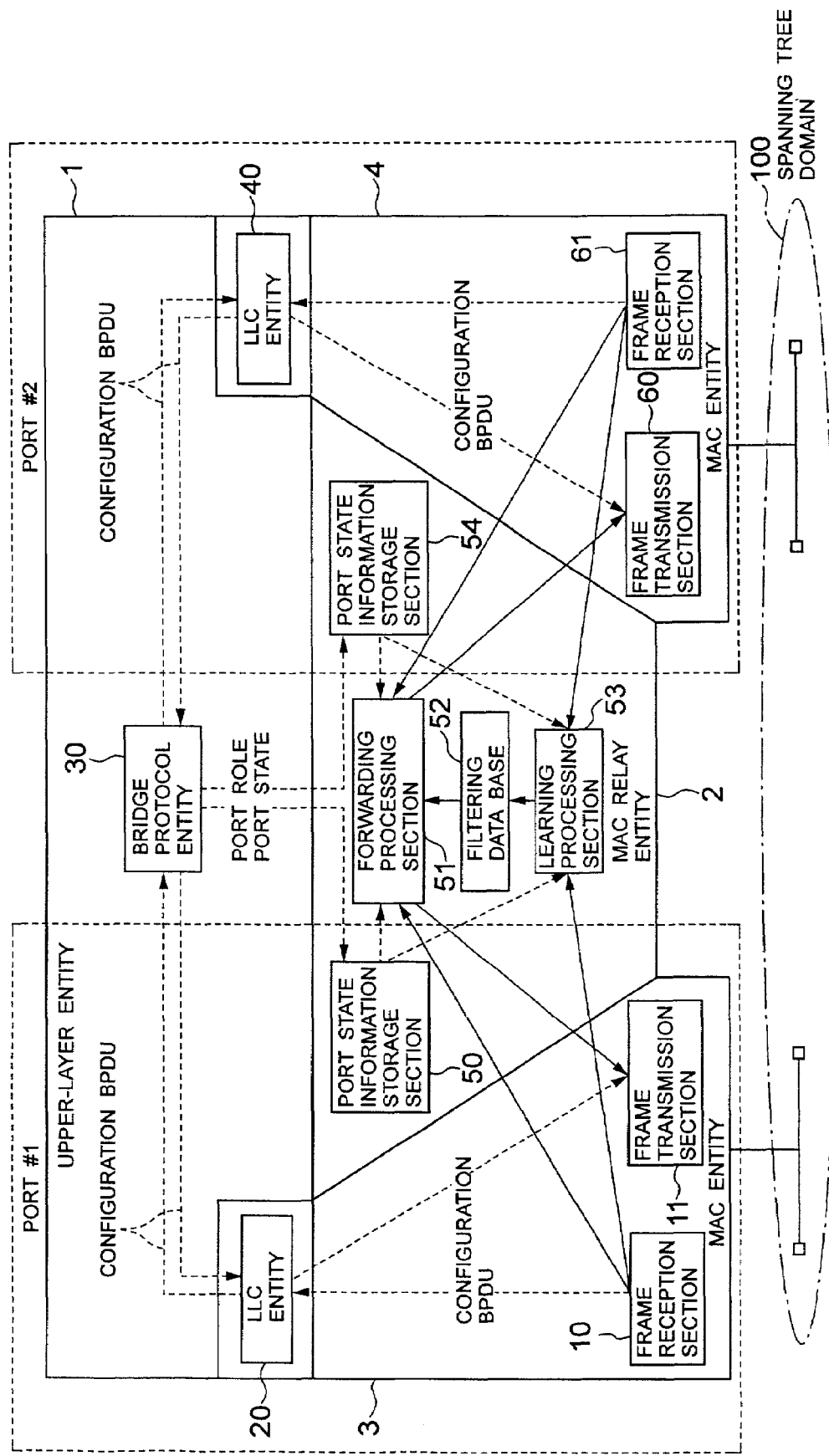
FIG. 8 is a block diagram showing the configuration of a conventional bridge.

Embodiments of the present invention will be described with reference to the accompanying drawings. FIG. 1 is a diagram showing the configuration of an embodiment of the present invention. FIG. 1 shows a bridge model for a port base type of spanning tree management bridge in accordance with the present invention. In FIG. 1, the components corresponding to those shown in FIG. 8 are indicated by the same reference numerals. Referring to FIG. 1, the difference of the bridge model of this embodiment from the conventional model shown in FIG. 8 resides in that bridge protocol entities are provided in correspondence with a plurality of ports. In this embodiment, bridge protocol entities 30 and 31 are independently provided in one-to-one relationship with ports #1 and #2, respectively. It is assumed that this assignment between the ports and the bridge protocol entities is set at the system design stage. A spanning tree domain 100 is connected to the port #1, while a spanning tree domain 101 is connected to the port #2.

A configuration BPDU relating to the spanning tree domain 100, which is input through the port #1, is transmitted by an LLC entity 20 to the bridge protocol entity 30. The bridge protocol entity 30 executes processing on the basis of the received configuration BPDU under the spanning tree protocol to determine port state information about the port #1, and stores the determined information in a port state information storage section 50. Similarly, the bridge protocol entity 31 at the port #2 performs processing to determine port state information about port #2, and stores the determined information in a port state information storage section 54.

Thus, the configuration BPDUs relating to spanning trees, input through the ports #1 and #2, are processed by the different bridge protocol entities 30 and 31, thus performing spanning tree protocol processings without interference to separately manage the spanning trees.

The bridge model of this embodiment will be described in more detail. The port base type of spanning tree management bridge in accordance with the present invention is constituted by an upper-layer entity 1 which performs processing in an upper layer, a MAC relay entity 2 which performs forwarding of data frames input from the ports, and MAC entities 3 and 4 which perform processings respectively related to the ports.

In one bridge, one upper-layer entity 1 and one MAC relay entity 2 exist. The MAC entities exist in a one-to-one relationship with the ports. The MAC entity 3 is constituted by a frame reception section 10 and a frame transmission section 11. The frame reception section 10 makes an error check on frames received from the port, discards some of the received frames under a certain condition, and transmits data frames not discarded to a forwarding processing section 51 and a learning processing section 53 in the MAC relay entity 2. The frame reception section 10 also transmits a control frame to the LLC entity 20.

The frame transmission section 11 receives a data frame from the forwarding processing section 51 and transmits the received frame to the port. If required, the frame transmission section 11 performs quality of service (QoS) control of the frame to be transmitted.

The MAC relay entity 2 is constituted by the forwarding processing section 51, the learning processing section 53, the filtering data base 52, and the port state information storage sections 50 and 54. The forwarding processing section 51 relays a frame on the basis of information about the source port stored in the port state information storage section 50 (54), port state information about the destination port stored in the port state information storage section 54 (50), and information in the filtering database 52. The learning processing section 53 writes the origin address in a received frame and the receiving port to the filtering data base 52.

The bridge protocol entities 30 and 31 exist in the upper-layer entity 1. In actuality, other various upper-layer protocol entities exist. However, they are irrelevant to the present invention and will not be described. The bridge protocol entities 30 and 31 process spanning trees and determine information (50, 54) on the states of the ports assigned by setting.

Finally, the LLC entities 20 and 40 establish connections between the MAC entities 3 and 4 and the upper-layer entity 1. Each LLC entity transmits a frame to the corresponding upper-layer entity according to a group MAC address written in a destination MAC address of the frame.

Processing in the port base type of spanning tree management bridge in accordance with the present invention at the time of spanning tree construction will be described with reference to FIG. 1. A configuration BPDU which relates to the spanning tree domain 100 and which is received through the port #1 undergoes an error check in the frame reception section 10 and is then sent to the LLC entity 20. The LLC entity 20 refers to the group MAC address written in the destination MAC address field of the frame and transmits the frame to the corresponding upper-layer entity, the bridge protocol entity 30 in this example.

The port #1 is assigned to the bridge protocol entity 30 in advance. The bridge protocol entity 30 determines port state information (port role, port state) about this port on the basis of a spanning tree algorithm (IEEE802.1D) and stores the determined information in the port state information storage section 50.

Processing in the bridge protocol entity 30 will be described with reference to the flowchart of FIG. 2. A configuration BPDU received through the port #1 is compared with a configuration BPDU (C-BPDU) parameter held by the bridge protocol entity 30 on the basis of the spanning tree algorithm (step S1).

If the configuration BPDU parameter held by the bridge protocol entity 30 is higher in precedence, sending out of a configuration BPDU formed by the held configuration BPDU is started and continued, the port role of this port is set to "Designated Port", and the port state is set to "Forwarding State" (stepS2). If the received configuration BPDU parameter is higher in precedence, the own configuration BPDU parameter and the bridge parameter are updated and sending of the configuration BPDU to the port #1 is stopped (step S3).

Then the port role of this port is set to "Root Port" and the port state is set to "Forwarding State" (steps S4 and S5). If at this time a configuration BPDU having a parameter further higher in precedence is received from another port using the same bridge protocol entity, the own configuration BPDU parameter and the bridge parameter are updated (step S6), the port role of this port is set to "Alternate Port", and the port state is set to "Blocking State" (step 7).

The same processing is performed with respect to the port #2 to determine port state information about the port #2. Since the ports #1 and #2 are assigned to the different bridge protocol entities 30 and 31, divided spanning tree domains 100 and 101 can be formed.

When port state information about each port is determined under the spanning tree protocol, forwarding and learning of data frames are started. In the frame reception section 10, an error check is made on a data frame received through the port #1. If the frame discard condition is not met, the data frame is sent to the forwarding processing section 51 and to the learning processing section 53.

Figure 3:
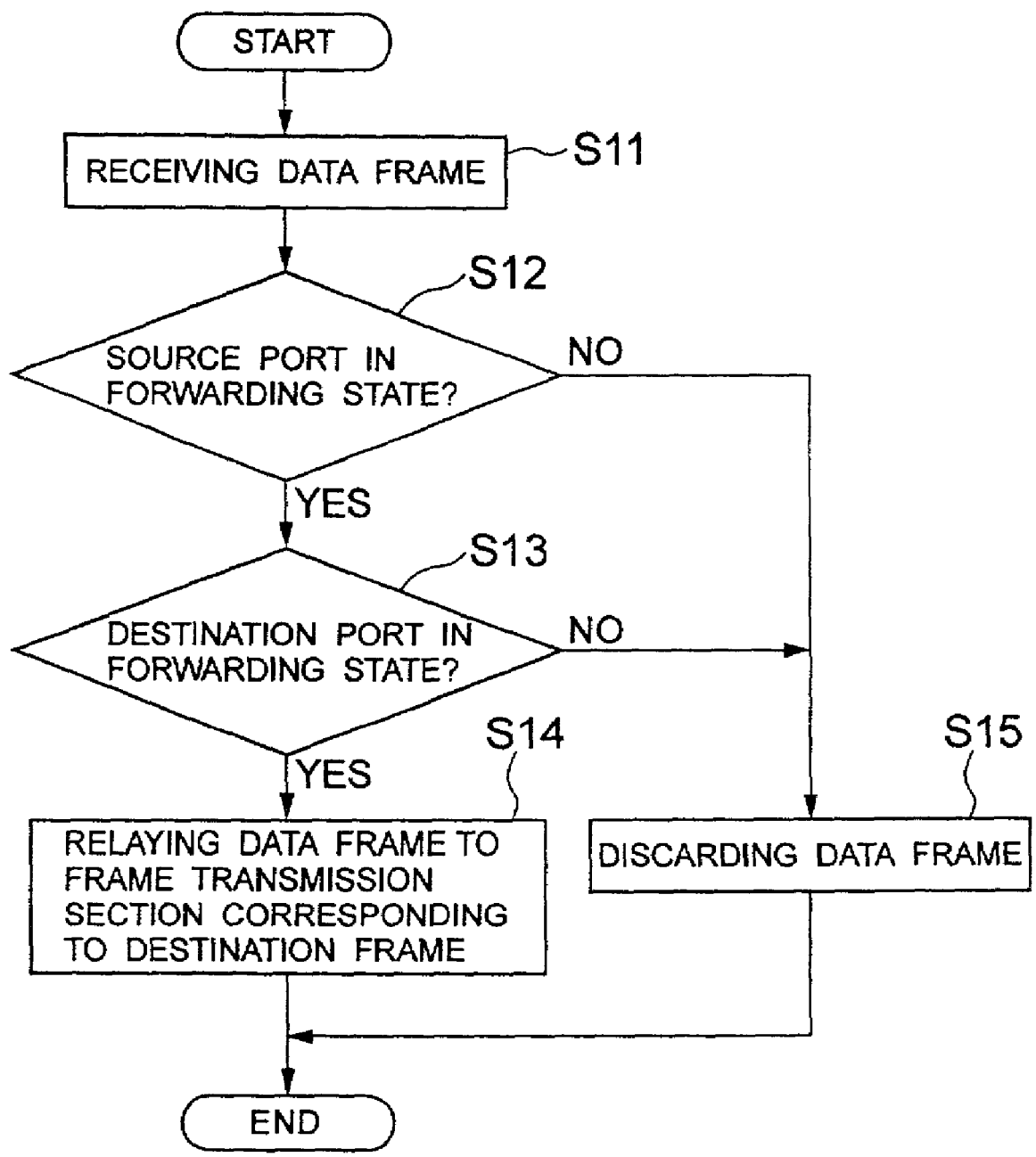
FIG. 3 is a flowchart of the operation of the embodiment with respect to forwarding.

The forwarding processing section 51 performs forwarding processing as shown in the flowchart of FIG. 3. That is, when a data frame is received (step S11), forwarding processing section 51 relays the data frame to the frame transmission section 60 of the destination port (S14) if with respect to this received data frame "the port state information about the source port is a forwarding-permitted state (forwarding state) " (step S12), and if the port state information about the port corresponding to the destination of this frame, which information is obtained by searching the filtering database 52, is a forwarding-permitted state (forwarding state)" (step S13). In other cases, the received data frame is discarded (step S15).

The learning process section 53 writes the origin address and the source port as a MAC table entry in the filtering data base 52 if the port state information about the source port is "learning permitted state (forwarding state or learning state) ". The frame transmission section 60 performs QoS control of the frame to be transmitted, if required.

Figure 4:
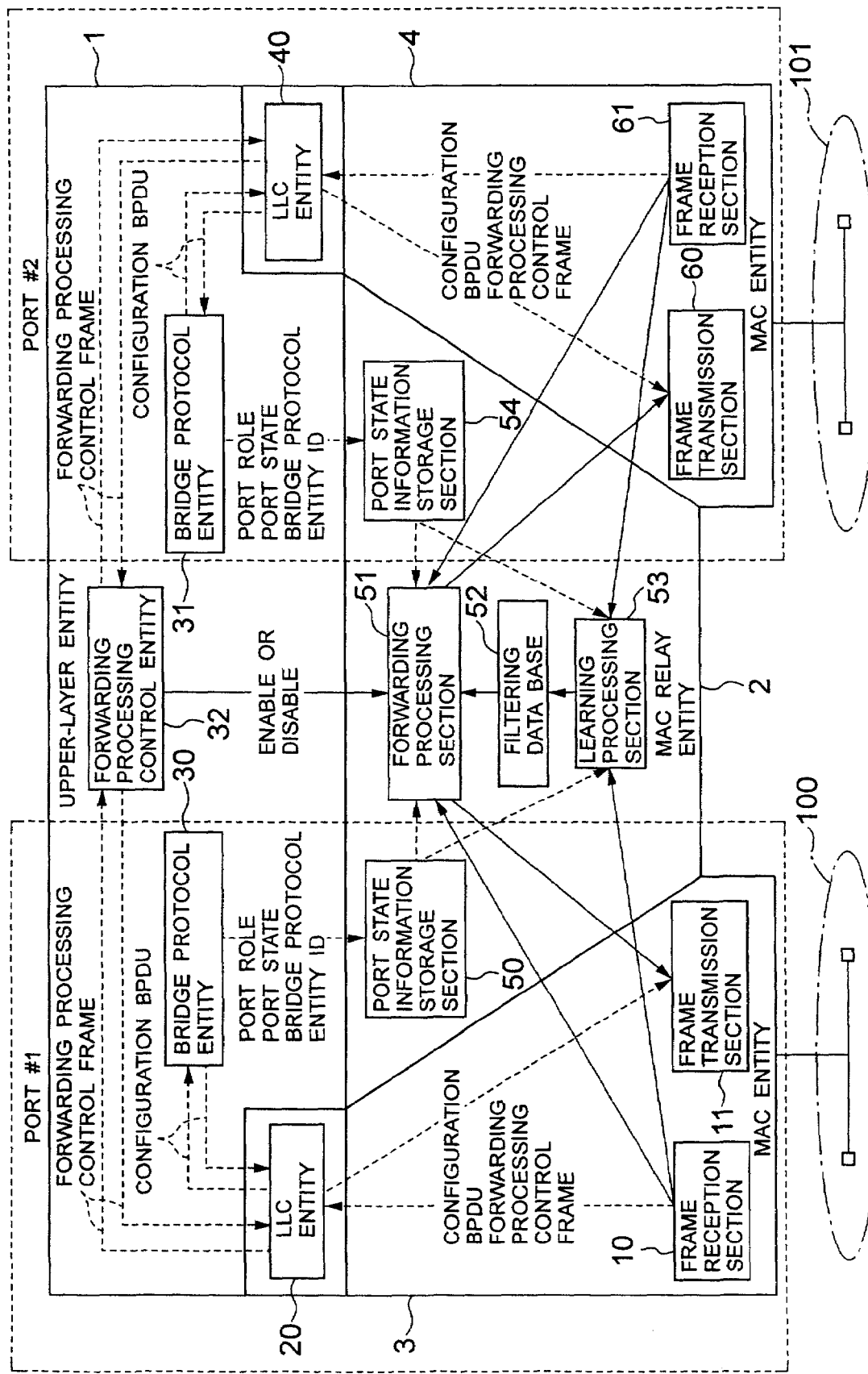
FIG. 4 is a block diagram showing the configuration of another embodiment of the present invention.

FIG. 4 is a diagram showing the configuration of another embodiment of the present invention. The components corresponding to those shown in FIG. 1 are indicated by the same reference numerals. In comparison with the bridge of the embodiment shown in FIG. 1, the bridge of this embodiment has an additional forwarding processing control entity 32 in the upper-layer entity 1, and has bridge protocol entity IDs (identification numbers) added as information to be written from the bridge protocol entities 30 and 31 to the port state information storage sections 50 and 54.

The bridge protocol entity ID is information for identification of the bridge protocol entity assigned to the corresponding port. The forwarding processing control entity 32 controls relay of frames between the ports having different bridge protocol IDs, i.e., between the spanning tree domains. In other respects, the configuration of this embodiment is the same as that shown in FIG. 1. Therefore no further description will be given of it.

Processing in this bridge at the time of spanning tree construction will be described with reference to FIG. 4. A configuration BPDU which relates to the spanning tree domain 100 and which is received through the port #1 is transmitted to the bridge protocol entity 30 by the same processing as that in the part base type of spanning tree management bridge of the present invention shown in FIG. 1. The bridge protocol entity 30 determines port state information such as information on a port role and a port state about this port on the basis of the spanning tree algorithm (IEEE802.1D) and stores the determined information items respectively in the port state information storage sections 50 and 54.

In this bridge, the bridge protocol entity ID representing the bridge protocol entity 30 is written to the port state information storage section 50 together with the port state information.

When port state information about each port is determined under the spanning tree protocol, forwarding and learning of data frames are started. A data frame received through the port #1 is sent to the forwarding processing section 51 and to the learning processing section 53 by the same processing as that in the port base type of spanning tree management bridge of the present invention shown in FIG. 1.

Figure 5:
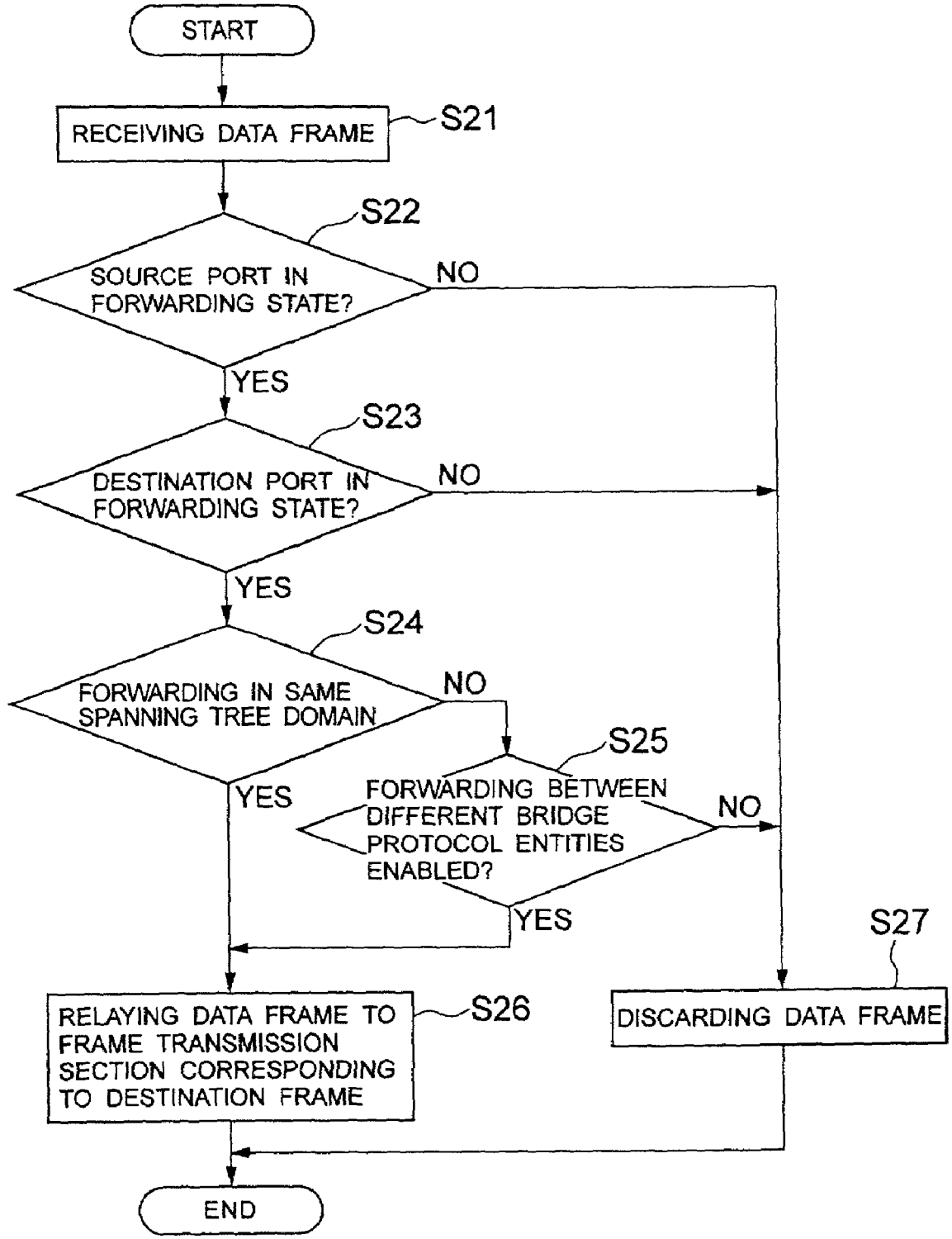
FIG. 5 is a flowchart of the operation of the embodiment shown in FIG. 4 with respect to forwarding.

The forwarding processing section 51 performs forwarding processing as shown in the flowchart of FIG. 5. That is, when a data frame is received (step S21), the forwarding processing section 51 relays the data frame to the frame transmission section 60 of the destination port (S26), if with respect to this received data frame "the port state information about the source port is a forwarding-permitted state (forwarding state)" (step S22), if the port state information about the port corresponding to the destination of this frame, which information is obtained by searching the filtering data base 52, is a forwarding-permitted state (forwarding state)" (step S23), and if "the bridge protocol entity ID of the source port and the bridge protocol entity ID of the destination port are identical (i.e., forwarding in one spanning tree domain), or the bridge protocol entity ID of the source port and the bridge protocol entity ID of the destination port differ from each other (i.e., forwarding between different spanning tree domains) (step S24) but forwarding between different bridge protocol entities is permitted (enabled) by the forwarding processing control entity 32" (step S25). In other cases, the received data frame is discarded (step S27).

Setting permitting (enabling) or not permitting (disabling) forwarding between different bridge protocol entities (see step S25) may be made in the forwarding processing control entity 32 by an operator.

Figure 6:
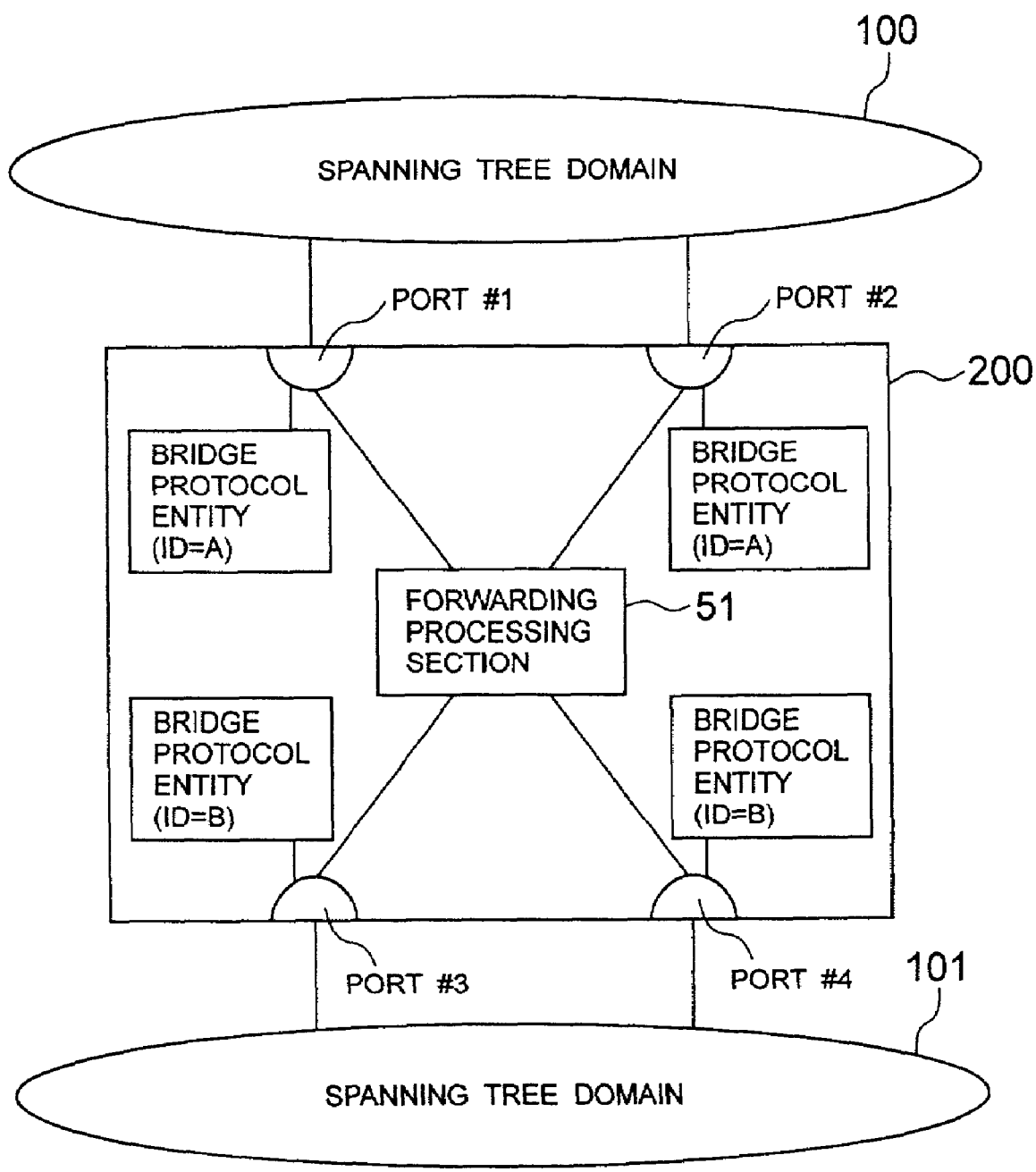
FIG. 6 is a block diagram showing the principle of a bridge in a general form in accordance with the present invention.

FIG. 6 schematically shows a bridge 200 having four ports, in which ports #1 and #2 belong to one spanning tree domain 100 and, therefore, the bridge protocol entities corresponding to these ports #1 and #2 are given the same bridge protocol entity ID ("A"). Also, ports #3 and #4 belong to one spanning tree domain 101 and, therefore, the bridge protocol entities corresponding to these ports #3 and #4 are given the same bridge protocol entity ID ("B"). The forwarding processing section 51 controls data frame transfer through these ports by considering the identity of this bridge protocol entity ID.

If "port state information about an source port indicates a learning-permitted state (forwarding state or learning state) ", the learning processing section 53 writes the origin address and the source port as a MAC table entry in the filtering data base 52. The frame transmission section 60 performs frame QoS control if necessary.

Figure 7:
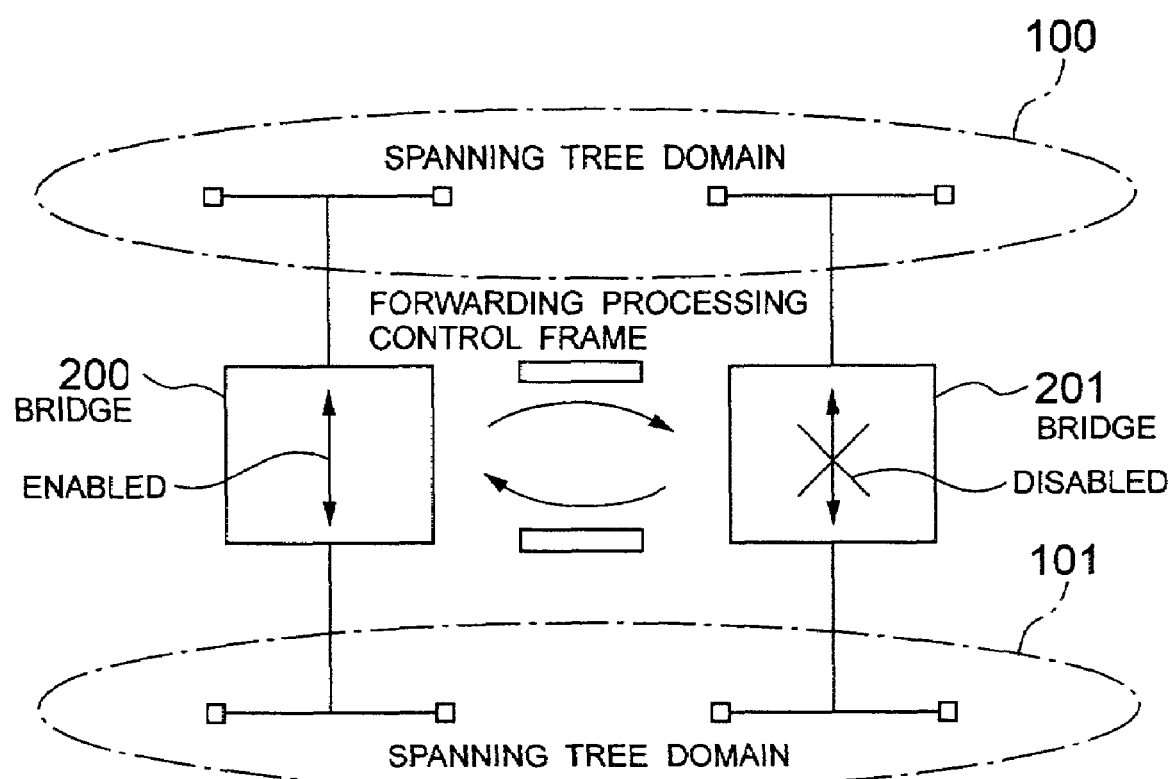
FIG. 7 is a diagram for explaining an example of application of the bridge of the present invention.

An application such as shown in FIG. 7 using this bridge is conceivable. Ordinarily, spanning tree domains must be connected each through one point in order to avoid formation of a loop between spanning trees. However, with the connection of a spanning tree through one point, there is a problem of the reachability (the facility with which a destination is reached by a data frame) being considerably reduced when a fault occurs in the connecting bridge.

Then, as shown in FIG. 7, this bridge 200 and another bridge 201 identical to the bridge 200 are connected at two points between spanning tree domains 100 and 101 and frame relay between the spanning trees through only one of the two bridges is enabled. If such a configuration is adopted, redundancy can be provided in the connection between spanning trees, such that the reachability of the system is maintained even when a fault occurs in one of the bridges 200 and 201.

In FIG. 7, enable/disable setting of frame relay between spanning trees by using a forwarding processing control frame is illustrated. Enable/disable setting of frame relay between spanning trees may be made in such a manner that a flag indicating one of the bridges in which frame relay is enabled and a flag indicating one of the bridges in which frame relay is disabled are written in the forwarding processing control frame and the control frame is periodically exchanged between the bridges. Needless to say, the above-mentioned setting by an operator may also be made instead of setting by exchange of this forwarding processing control frame.

Figure 2:
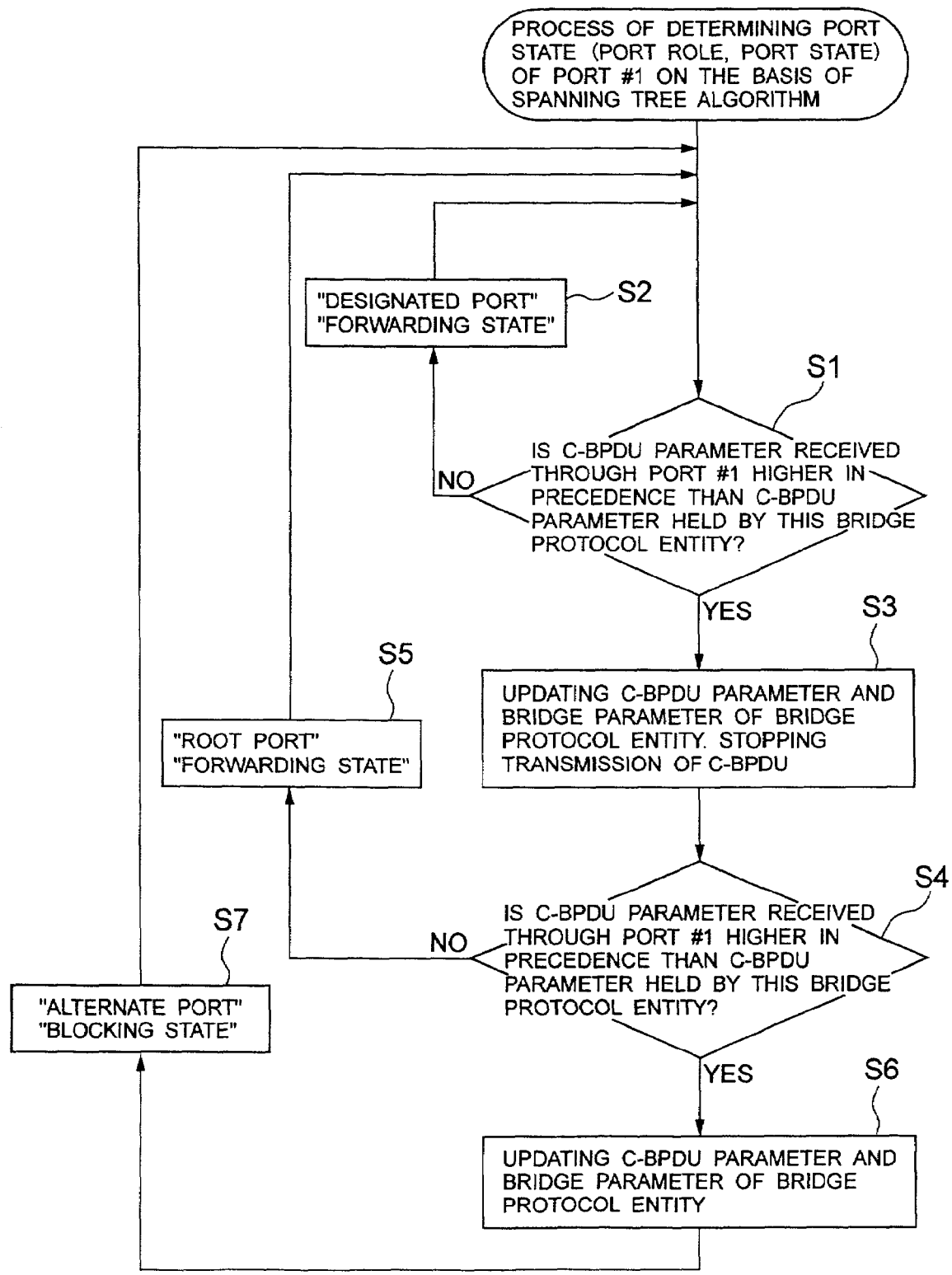
FIG. 2 is a flowchart showing the operation of the embodiment of the invention with respect to bridge protocol processing.

It is apparent that the procedures shown in the flowcharts of FIGS. 2, 3, and 5 can be realized by being written in advance as programs on a storage medium such as a read-only memory and by being read to and executed by a computer. While LANs have been mentioned as a network to which the present invention is applied, the present invention is not limited to the above-described application. The bridges shown in FIGS. 1 and 4 can also be applied to a wide range of communication apparatuses having bridging functions in the data link layer.

According to the present invention, effects described below are obtained. First, it is possible to divide a spanning tree domain by using the port base type of spanning tree management bridge of the present invention. Second, it is possible to divide only a spanning tree domain without avoiding division of a broadcast domain by using the port base type of spanning tree management bridge.

What is claimed is:

1. A communication apparatus comprising a plurality of ports connected to a network, and a plurality of bridge protocol processing means for constructing spanning trees, wherein said ports and said bridge protocol processing means are assigned in a one-to-one relationship with each other, wherein each of said bridge protocol processing means constructs a spanning tree by exchanging a bridge protocol data unit (BPDU) with other communication apparatuses through the port assigned to said bridge protocol processing means.

2. The communication apparatus according to claim 1, further comprising transfer control means for controlling transfer of a data frame between said ports.

3. The communication apparatus according to claim 2, wherein said transfer control means transfers the data frame if the data frame is transferred between the ports belonging to one spanning tree domain.

4. The communication apparatus according to claim 1, wherein said transfer control means transfers the data frame, provided that, in the case of transfer between the ports belonging to different spanning tree domains, data frame transfer between the different spanning tree domains is permitted in advance.

5. The communication apparatus according to claim 4, wherein the bridge protocol processing means assigned to the ports belonging to one spanning tree domain are given the same identification information, while the bridge protocol processing means assigned to the ports belonging to different spanning tree domains are given different identification informations, and wherein, in controlling transfer of the data frame, said transfer control means controls transfer of the data frame on the basis of the identity of the identification information between the source port and the destination port.

6. A communication system comprising a plurality of networks and a communication apparatus with which said networks are interconnected, wherein said communication apparatus comprises a plurality of ports connected to said networks, and a plurality of bridge protocol processing means for constructing spanning trees, said ports and said bridge protocol processing means being assigned in a one-to-one relationship with each other, wherein each of said bridge protocol processing means constructs a spanning tree by exchanging a bridge protocol data unit (BPDU) with other communication apparatuses through the port assigned to said bridge protocol processing means.

7. The communication system according to claim 6, wherein said communication apparatus further comprises transfer control means for controlling transfer of a data frame between said ports.

8. The communication system according to claim 7, wherein said transfer control means transfers the data frame if the data frame is transferred between the ports belonging to one spanning tree domain.

9. The communication system according to claim 7, wherein said transfer control means transfers the data frame, provided that, in the case of transfer between the ports belonging to different spanning tree domains, data frame transfer between the different spanning tree domains is permitted in advance.

10. The communication system according to claim 7, wherein the bridge protocol processing means assigned to the ports belonging to one spanning tree domain are given the same identification information, while the bridge protocol processing means assigned to the ports belonging to different spanning tree domains are given different identification informations, and wherein, in controlling transfer of the data frame, said transfer control means controls transfer of the data frame on the basis of the identity of the identification information between the source port and the destination port.

11. A method of controlling communication in a communication system including a plurality of networks and a communication apparatus with which the networks are interconnected, and which includes a plurality of ports connected to the networks, and a plurality of bridge protocol processing means for constructing spanning trees, the ports and the bridge protocol processing means being assigned in a one-to-one relationship with each other, said method comprising a step of constructing, in each of the bridge protocol processing means, a spanning tree by exchanging a bridge protocol data unit (BPDU) with other communication apparatuses through the port assigned to the bridge protocol processing means.

12. The method of controlling communication according to claim 11, further comprising a transfer control step for controlling transfer of a data frame between the ports in the communication apparatus.

13. The method of controlling communication according to claim 12, wherein, in said transfer control step, the data frame is transferred if the transfer is performed between the ports belonging to one spanning tree domain.

14. The method of controlling communication according to claim 12, wherein, in said transfer control step, the data frame is transferred, provided that, in the case of transfer between the ports belonging to different spanning tree domains, data frame transfer between the different spanning tree domains is permitted in advance.

15. The method of controlling communication according to claim 12, wherein the bridge protocol processing means assigned to the ports belonging to one spanning tree domain are given the same identification information, while the bridge protocol processing means assigned to the ports belonging to different spanning tree domains are given different identification informations, and wherein, in controlling transfer of the data frame in said transfer control step, transfer of the data frame is controlled on the basis of the identity of the identification information between the source port and the destination port.

16. A recording medium on which is recorded a program for making a computer execute control of the operation of a communication apparatus with which a plurality of networks are interconnected, and in which a plurality of ports connected to the networks and a plurality of bridge protocol processing means for constructing spanning trees are assigned in a one-to-one relationship with each other, said program comprising a step of constructing, in each of the bridge protocol processing means, an independent spanning tree by exchanging a bridge protocol data unit (BPDU) with other communication apparatuses through the port assigned to the bridge protocol processing means.

* * * * *